(12) United States Patent
Hatami-Hanza

(10) Patent No.: US 8,452,725 B2
(45) Date of Patent: May 28, 2013

(54) SYSTEM AND METHOD OF ONTOLOGICAL SUBJECT MAPPING FOR KNOWLEDGE PROCESSING APPLICATIONS

(75) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 592 days.

(21) Appl. No.: 12/547,879

(22) Filed: Aug. 26, 2009

(65) Prior Publication Data
US 2010/0057762 A1 Mar. 4, 2010

Related U.S. Application Data

(60) Provisional application No. 61/093,952, filed on Sep. 3, 2008.

(51) Int. Cl.
*G06F 17/30* (2006.01)
(52) U.S. Cl.
USPC ........... 707/603; 707/738; 707/741; 707/776; 707/942
(58) Field of Classification Search
USPC ....... 707/101, 104.1, 102, E17.005, E17.044, 707/E17.046, 736, 737, 738, 740, 741, 748, 707/749, 750, 752, 753, 755, 776, 777, 961, 707/963, 603, 706, 711, 941, 942
See application file for complete search history.

(56) References Cited

U.S. PATENT DOCUMENTS

| | | | | |
|---|---|---|---|---|
| 6,640,231 B1 * | 10/2003 | Andersen et al. | ...................... | 1/1 |
| 7,657,546 B2 * | 2/2010 | Goodwin et al. | .......... | 707/999.1 |
| 7,689,557 B2 * | 3/2010 | Pandit et al. | .................. | 707/771 |
| 2006/0075013 A1 * | 4/2006 | Hite et al. | ..................... | 709/201 |

* cited by examiner

*Primary Examiner* — John E Breene
*Assistant Examiner* — Evan Aspinwall

(57) ABSTRACT

The present invention discloses methods, systems, and tools for knowledge processing by building maps of ontological subjects for compositions or the contents accompanying a request for service by a user. In one embodiment of the invention the method assigns and calculates an ontological subject power spectrum to each composition or ontological subject. The resulting power spectrum and the adjacency matrix of the map are used to evaluate the merits of the compositions in the context of reference universes. It is also used as a research guiding tool for knowledge discovery. The invention serves knowledge seekers, knowledge creators, inventors, discoverer, as well as general public by assisting and guiding users to assess their work, identify their unknowns, optimize their research trajectory, and provide higher quality contents. The method and system, thereby, is instrumental in increasing the speed and efficiency of knowledge acquisition, discovery, retrieval, as well as faster learning and problem solving.

42 Claims, 12 Drawing Sheets

SYSTEM AND METHOD OF ONTOLOGICAL SUBJECT MAPPING FOR KNOWLEDGE PROCESSING APPLICATIONS

CROSS REFERENCED TO RELATED APPLICATIONS

This application claims priority from U.S. provisional patent application No. 61/093,952 filed on Sep., 3, 2008, which is incorporated herein by reference.

FIELD OF INVENTION

This invention generally relates to information processing, knowledge processing and discovery, knowledge retrieval, artificial intelligence, ontology organization and applications.

BACKGROUND OF THE INVENTION

Current methods of research and knowledge discovery utilizing informational retrieval systems and search engines are not very efficient. They are very time consuming and often requires that user poses lots of expertise and previous knowledge and background to effectively use the information given by the informational retrieval systems for a user's subject matter of interest.

SUMMARY OF THE INVENTION

Currently, knowledge acquisition, retrieval, and discovery very much depend on the skill, dept and breadth of a researcher's knowledge. The problem that often slows down the knowledge acquisition and discovery is lack of awareness of unknowns. For example, when we want to do research in a subject or a topic, we usually use search engines to collect all the related data and often we overwhelmed with the number and extent of the documents found related to that subject. One should diligently read and analyze so many documents to find out that in order to master the subject/topic she/he should have known other subjects/topics first. Or find out after a long a period of time that in the process of understanding, analyzing and coming up with a solution, or a useful idea, related to a challenging problem, she/he has missed or overlooked many other important subjects. Therefore, it is important, desirable, and valuable to know and sort the most important things to know related to a subject.

In some other applications such as question answering and knowledge retrieval from a knowledge database, one need to know what are there to know at first and then looking for how they are related in order to build and enrich the knowledge database that is able to serve a client satisfactorily. Currently there is no systematic way of building such a database or general ontology consisting of statements of verified facts. The few attempts to build such useful databases are based on human labor or complicated reasoning and first order logic framework, rather than a systematic and automatic way of finding the distilled knowledge from the vast repositories of human generated data available over the internet.

More importantly in applications such as new knowledge discovery, education, essay examination, self education, scientific paper evaluation, composing new knowledge, business proposal evaluations, and many others it would be very helpful and desirable if we can measure the importance and intrinsic value of a composition in the universal context or in comparison with a large repository of knowledge. So that one can make sure that a composition is sound or the knowledge therein is genuinely valuable and original. Especially in publishing user generated content it is important to check the substance and merit of submitted contents before being published or sending through the costly process of expert reviewing.

All the above and many more arguments indicate a need in the art of knowledge discovery, knowledge retrieval, and knowledge publishing and the like, for a reference map of knowledge-bearer-components that is easy to navigate based on their intrinsic importance in the context of our universe. Moreover, there is a need for such knowledge maps and their corresponding databases for ranking and measuring the merit of newly composed documents or electronic contents and/or ranking existing compositions for more relevant retrieval, knowledge navigation, exploration, and generally assisting users in their research to gain speed and efficiency.

In this disclosure the knowledge-bearer-components are called Ontological Subjects (OS) and the present invention is about systems and methods of building ontological subject maps (OSMs). The system and method is instrumental for applications in ranking, merit evaluation of compositions, knowledge retrieval, knowledge exploration, research trajectory guiding, knowledge visualization, contribution measurement of new composition, and novelty detection as well as many other applications such as summarization, automatic report generation, question answering, and the like. The Ontological Subject Maps (OSM) are build using a plurality of ontological subjects by building the co-occurrence matrix and estimating association value of each two ontological subjects that have participated in one or more compositions or the parts thereof.

For each or any collection of compositions a universe, containing ontological subjects, is defined that the composition is trying to describe. According to one embodiment of the invention, the intrinsic importance of each ontological subject in the context of its universe is then calculated by defining a power value function for each ontological subject. The OSM can be build for single composition or for the entire repository of human knowledge such as the whole content of internet. The OSM and power spectrum of corresponding ontological subject build from the universe of the composition can be compared to a reference OSM build from a larger universe in order to assign a rank or merit for a composition for variety of applications mentioned above. Different exemplary metrics for comparison and merit valuation is proposed and introduced that are indicatives of intrinsic value of a composition such as authoritativeness, novelty, and substance. When the reference OSM is derived from a much larger repository or collection of repositories or the whole internet content, the calculated power of the ontological subjects are then universal. The power of OSs is, therefore, an indication of their intrinsic rule or importance in the real universe based on the comprehension of human beings since the start of civilization. Consequently ranking or assigning a weigh for each composition, based on its OS spectrum, is also universal.

In another embodiment, the reference OSM is proposed to be used for knowledge navigation and research trajectory identification. Since the map, when derived from large enough repositories, is basically map of human knowledge, a system and method is provided to guide a user to achieve her/his research goal much more efficiently and faster than using current search engine and knowledge navigation methods.

In yet another embodiment and application of the invention, the OSM is used to select a desirable number of OSs of interest and by way of searching and statistics to find the verified statements of the facts about that OS from a corpus or a collection of compositions related to that OS. Moreover for each two or more associated OS, it looks for explicitly expressed relations between those OSs and statistically verifies the specifics of their relationship and index the verified relationship in a knowledge database in the form of true statements containing two or more OSs. Thereby building a universal ontology becomes more automatic and efficient. The universal ontology has many important applications such as question answering and automatic useful knowledge discovery by reasoning and first order logic.

BRIEF DESCRIPTION OF THE DRAWINGS

FIG. 1: illustrate the concepts of compositions as attempts to describe their universes.

DETAILED DESCRIPTION

Definitions

Figure 1A:
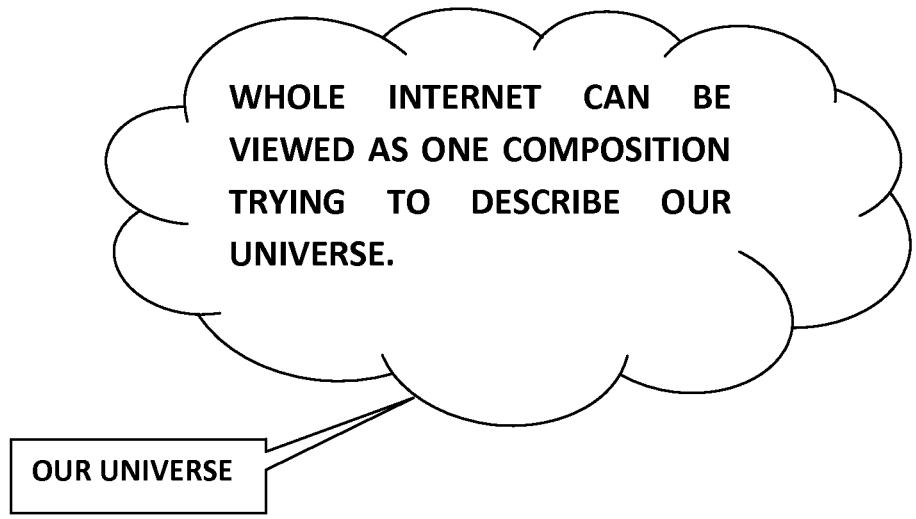
FIG. 1a, shows the internet as one composition (the largest) trying to describe our universe.

1. Ontological Subjects: means generally any string of characters, but more specifically letters, numbers, words, sound signal tracks, video signal tracks, or any combinations of them, and more specifically all such string combinations that indicates or refer to an entity, concept, quantities, and the incidences of such entities, concepts, and quantities. In this disclosure Ontological Subject/s and the abbreviation OS or OSs are used interchangeably.

2. Composition: means any combination of ontological subjects, particularly text documents written in natural language documents, data files, voice files, video files, and any mixture thereof.

3. Universe: in this disclosure "universe" is frequently used and have few intended interpretation: when "universe x" (x is a number or letter or word or combination thereof) is used it mean the universe of one or more compositions, that is called x, and contains none, one or more ontological subjects. By "real universe" or "our universe" we mean our real life universe including everything in it (physical and its notions and/or so called abstract and its notions) which is the largest universe intended and exist. Furthermore, "universal" refers to the real universe.

All the electronic contents are compositions of a number of ontological subjects. The quality of composition's content in terms of its substance, validity, usefulness or beauty lies in the way that the content has been composed. While the number of possible compositions is endless, real life ontological subjects, however, are limited. All the compositions are talking about some of the ontological subjects of our universe. However, the real universe itself is one subject that has been functioning consistently for a long time. Therefore the underlying knowledge describing the working mechanism of our universe should be one well composed, e.g. written, composition that we as human are trying to uncover. Consequently the description of such system including all that there is in it and all the details should be straightforward once the relations between the parts become verifiably well known.

Our universe consists of parts, big and small, and whereas some parts of the universe is more important than the others. In describing our universe we usually can only focus on very small parts of it. However, focusing only on a small part of our universe can be misleading if the corresponding expressive statements don't get verified in the context of larger parts of the real universe. Therefore it is always more useful and more valuable to assess a composition, e.g. document, in larger context than a specific context or specific domain of discourse.

Universes of Compositions

In this invention we view each composition as a document that is trying to describe a universe of its own. The universe of a composition could be a true part of our real universe and is considered true if matches to a part of a larger part of the real universe, or could be partly true if it is not a perfect match and sometimes could be totally wrong if does not match at all. Currently the description of a universe by a composition is done by showing and establishing relations between ontological subjects of that universe by natural languages. Accordingly, we define, for each composition, a universe that the composition is trying to describe by combining and relating the ontological subjects of the corresponding universe.

Figure 1B:
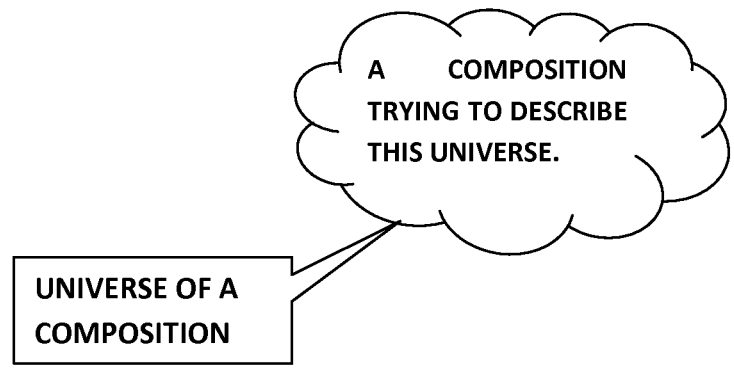
FIG. 1b, shows that any other composition can also be viewed as an attempt to describe a smaller universe, i.e. its own universe.

It can be argued that, currently, the largest repository of human knowledge is the internet. A collection of billions of documents each has tried to prove or establish a relation between some parts of the real universe. FIG. 1a, shows that the biggest human data repository, e.g. the internet, is trying to explain the universe around us whereas in FIG. 1b, illustrate a smaller composition which is trying to describe its own universe. The two universes might overlap in some parts and one universe maybe a subset of another universe as is the case in reality.

While it is difficult to become a master in any domain of discourse it becomes prohibitively difficult for human being to become a master in several domains of discourse. On the other hand more and more multidisciplinary expertise is required to discover important relations between the ontological subjects of different universes. Consequently it is important to know what are there to know in any universe and what is important to know firstly, secondly and so on. Hence whoever is trying to uncover some details of the real universe should be able to measure the importance and the value of his/her contribution in a much larger universal context. For instance, we have to have a way of distinguishing between a composition describing a valid and true breakthrough in cancer treatment from similar compositions claiming the same but in fact are partially valid and true. Furthermore, it is, for instance, important to know which discovery or invention is more important by how much and why. For example, discovery of new source of energy is more important than finding a solution for decreasing the production cost of a trivial specific product.

In a US patent application entitled "Assisted Knowledge Discovery And Publication System And Method", filed on Jul. 24, 2008, with the application Ser. No. 12/179,363 by the same inventor, an ontological subject mapping method was disclosed and an Ontological Subject Map (OSM) was used as a reference to assist in assessment of a submitted electronic content for considering for publication by an electronic publishing shop. In that application the preferred reference OSM is the universal OSM that is aiming to map all the possible and existing ontological subjects (OSs). However, such a universal map can take a long time to construct.

In one embodiment of the present invention we use a universe of reference which could be smaller than the universe of whole internet yet yield satisfactory benefits of a universal OSM. Accordingly we first introduce a method and system of building OSM for any exemplary universe of ontological subjects and then show the methods and systems of using such a map for different applications.

Participation, Co-Occurrence, and Association Value Matrixes for Building OSMs

Now we describe the steps of building an OSM for a composition describing universe 1, i.e. u1, in what follows here.

Break the composition to desired M number of partitions. For example, for a text document we can break the documents into chapters, pages, paragraphs, lines, and/or sentences etc. Identify the ontological subject of the composition by appropriate method such as parsing a text documents into its constituent words and phrases, and select a desired N number of the OS existing in the composition, according to certain predetermined criteria.

Then construct a binary N×M matrix in which the ith raw ($R_i$) is a binary vector, with dimension M, indicating the presence of $OS_i$ in each of the partitions of the composition (PC) by having the value of one, and not present by the value of zero.

We call this binary matrix the Participation Matrix (PM)

$$PM = \begin{matrix} & PC_1 & \cdots & PC_M \\ OS_1 & \begin{pmatrix} pm_{11} & \cdots & pm_{1M} \\ \vdots & \ddots & \vdots \\ pm_{N1} & \cdots & pm_{NM} \end{pmatrix} \\ \vdots & \\ OS_N & \end{matrix} \quad (1)$$

where $PC_i$ is the ith partitioned part of the composition, $OS_i$ is the ith Ontological Subject from the list of OSs extracted from the composition, and $PM_{i,j}=1$ if $OS_i$ is in the $PC_j$ and 0 otherwise.

The participation matrix is in fact a transformation of information representation from the usual forms of compositions of the ontological subjects, e.g. textual, to numerical matrixes which are easier for processing by computers and specific or predesigned systems of hardware and software.

Having built the PM, we then can calculate and construct the co-occurrence matrix by:

$$C(OS_i, OS_j) = C_{i,j} = f(R_i, R_j) \quad (2)$$

where C is the co-occurrence matrix, $R_i$ and $R_j$ are the ith and jth row of the PM, and $f$ is a predefined function or operator of the two binary vectors $R_i$, $R_j$. The function $f$ usually is the inner product or scalar multiplication of the two vectors. The matrix C has the form of:

$$C = \begin{matrix} & OS_1 & \cdots & OS_N \\ OS_1 & \begin{pmatrix} c_{11} & \cdots & c_{1N} \\ \vdots & \ddots & \vdots \\ c_{N1} & \cdots & c_{NN} \end{pmatrix} \\ \vdots & \\ OS_N & \end{matrix} \quad (3)$$

The matrix C is symmetric and in fact, could be viewed as an adjacency matrix of a weighted undirected graph. It contains useful information that can be used to calculate or estimate the importance of the OS in such graph derived from a composition corresponding to its universe. Importance factor could be simply counts, node centrality measure, etc. More importantly the row of the matrix C shows the association set for each OS with the related association value. Furthermore we can also define a more useful column-normalized association matrix, called A here, that can also be built from C, with entries defined as:

$$A_{i,j} = \frac{c_{i,j}}{\sum_{j=1}^{N} C_{i,j}}. \quad (4)$$

However for some applications, proposed here, such as knowledge navigation and exploration a directed graph which is more like a guiding map is more appropriate and desirable. We consequently introduce the Ontological Subject Map (OSM) which is a multilayer index of OSs configured to position each OS uniquely on a map with connection to its most important associates and multistep routes to all other OSs.

Figure 2:
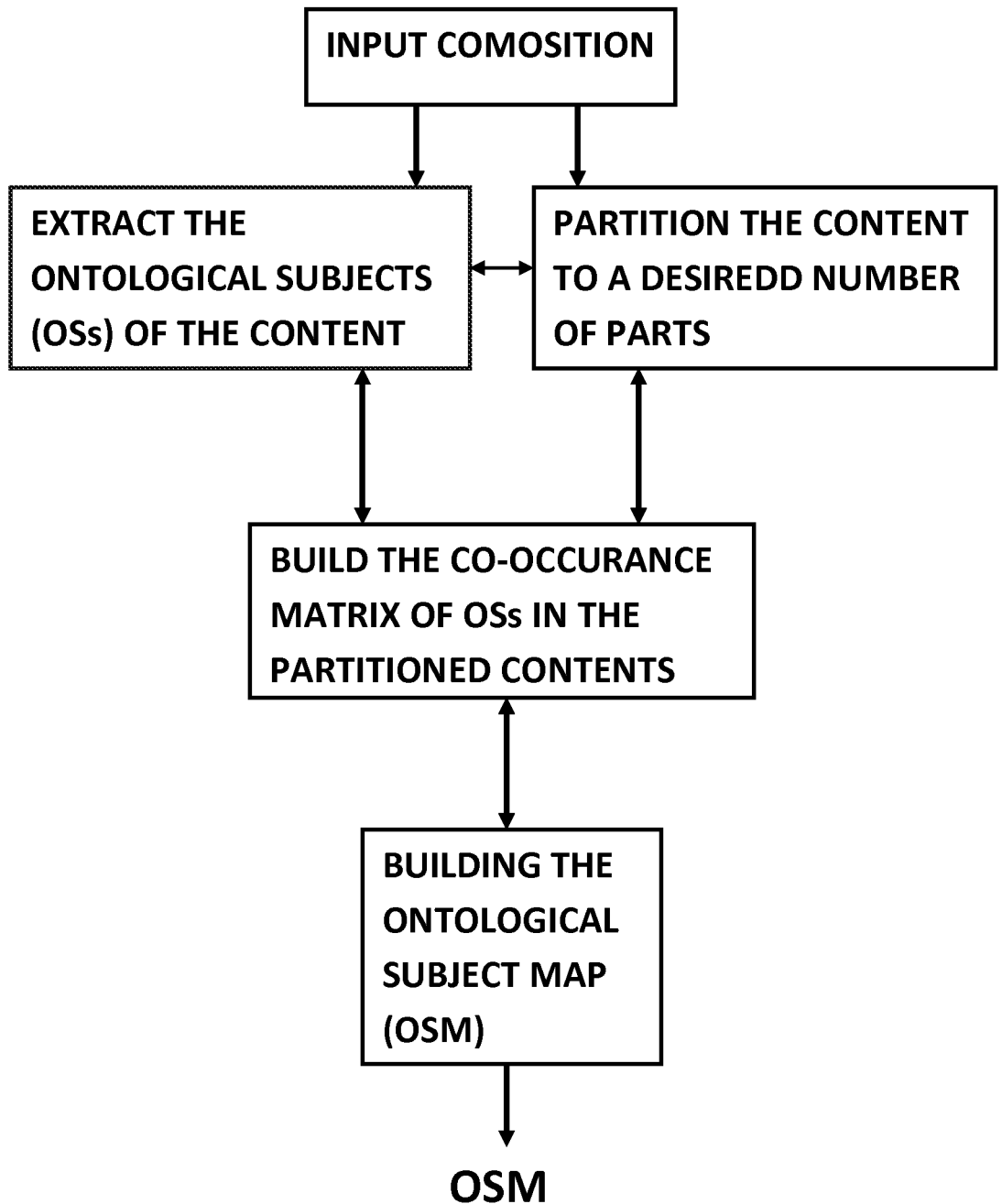
FIG. 2: is a flowchart of building an Ontological Subject Map (OSM) from an input composition.

FIG. 2 shows one simplified embodiment of a flowchart of building an OSM for a composition, with the composition as the input to the system of computer readable medium. FIG. 2 shows the basic building blocks of constructing an OSM for a composition as described above. Before launching into describing the algorithm and the method of building an OSM for a composition, we can look at the representation and specifics of OSM as a graph.

Figure 3:
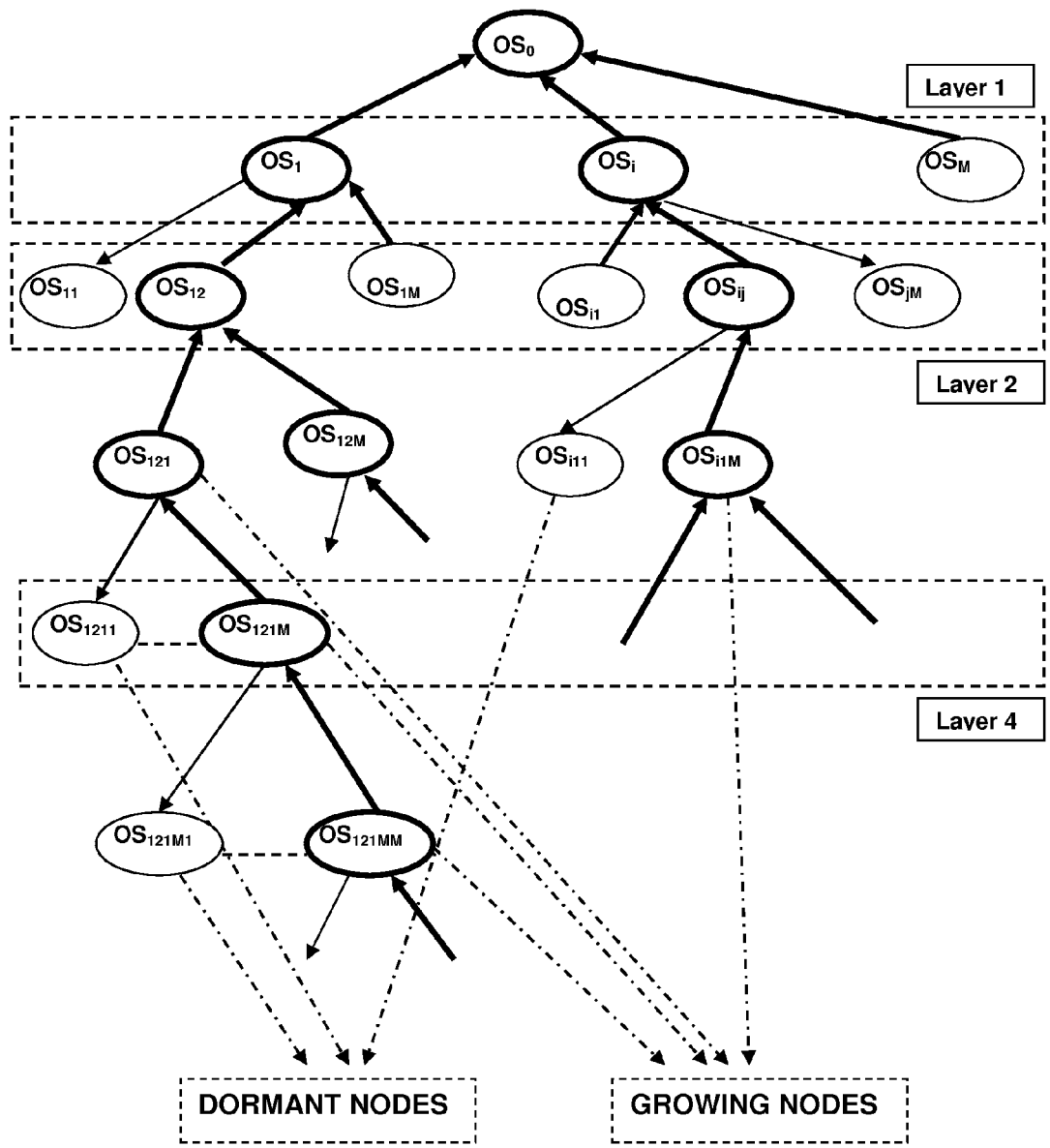
FIG. 3: is one graphical representation of OSM, thick line circles are growing nodes and thick arrows show the connection between growing nodes (i.e. non-dormant nodes, see the detailed description), thin line circle show dormant nodes and thin arrows show the connection between a growing node and its dormant associated node. Dormant node is an image of a growing node somewhere in the map. In this representation embodiment dormant nodes do not point to their growing positions.
Figure 4:
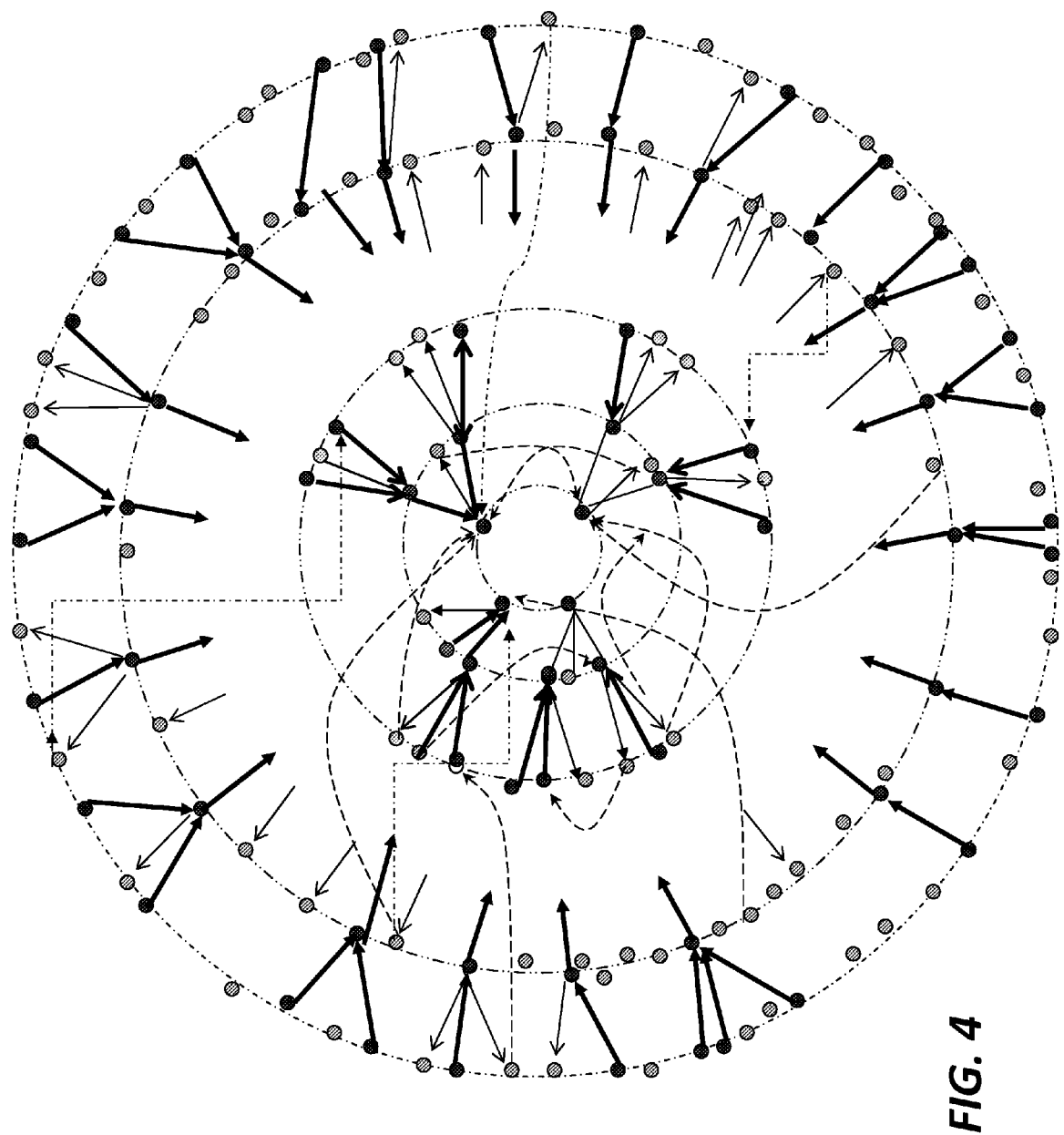
FIG. 4: is another graphical representing of OSM, wherein nodes are placed around co-centered circles of different layers (shown by broken line large circles). In this representation embodiment, the small darker filled circles are indicative of a growing node, and thick arrows show the connection between two growing nodes, and gray filled circles show the dormant node whereas the thinner arrow shows the connection between a growing node to a dormant node or a dormant node to its original growing place in the map. Dormant node is an image of a growing node somewhere in the map and in this representation embodiment dormant nodes point to their growing positions.

OSM Graphs:

The OSM is essentially a directed (preferably weighted) graph in which each OS is represented by a node as shown in FIGS. 3, and 4. FIGS. 3 and 4, show two different ways of drawing such a map. In FIG. 3, the map is in the form of a tree and in FIG. 4 the OSM is depicted in the form of multilayer circles, wherein in FIG. 3 the nodes distributed over a line and in FIG. 4 the nodes are distributed over a circle, according to a predetermined algorithm.

As seen in the FIG. 3, there are two types of nodes and two types of connections between the nodes. The thicker line ellipse shows a growing node that is connected to at least one node in its below layer in the graph while the thinner line ellipse indicates a dormant node that is only connected to its above or same layer node in the graph. Similarly the thicker line arrows show the connection between two growing nodes and the arrow is from a below layer growing node to its above layer growing node, and the thinner line arrows show the connection between a growing node and a dormant node and the arrow is from the above layer growing node to its below layer dormant node. As seen in FIG. 3 a below layer is numbered higher than an above layer, e.g. layer 3 is below layer 2. The text inside the ellipses denotes one way of indexing the nodes as described in the U.S. patent application Ser. No. 12/179,363, filed on Jul. 24, 2008, by the same inventor.

A dormant node is in fact a mirror of a growing node somewhere in the graph. The corresponding index of the graph contains the information related to the address of originally growing position of the dormant node. In other words, dormant nodes points to their originally growing positions in the graph. However, in FIG. 3 the connection between a dormant node and its original position is not shown for clarity and simplicity of the represented graph.

FIG. 4 depicts another exemplary graphical representation of an OSM. In this representation's embodiment, nodes are positioned along co-centered circles. The growing nodes in this embodiment are shown by darker filled circles and dormant nodes are shown by gray filed circles. Similar to FIG. 3 the growing nodes are connected with thick line arrows and from a below layer growing node to its above layer growing node. Again similar to FIG. 3 the connection between a growing node and its dormant node is shown by thinner line arrow which originates from a growing node to its dormant node. As seen in FIG. 4 the connection (i.e. the broken line arrow) from a dormant node to its originally growing position in the graph is also shown. This help to visualize the centrality of each node, i.e. each OS. In FIG. 4, a below layer is further away from the center than an above layer.

It should be noticed that in FIGS. 3 and 4, only few exemplary connections have been depicted for clarity of the picture while making the intended point. Moreover, as seen, each growing node points to only one growing node in the above layer and connect to one or more nodes in below layer, and a dormant nodes is not connected to any node from below layers.

OSM Building Algorithm

In the preferred method, the OSM in FIG. 3, or 4 is built, using the information of co-occurrence matrix C and association matrix A, which are derived from the participation matrix PM, based on the following algorithm:

Select a first set of ontological subjects, having at least one member, which have the highest importance factor, e.g. highest occurrence counts. In the map put the first set of OS in the first layer and showing each OS by a node. For each of this first layer OSs form an association set, having a desired number of OSs that have association value of higher than a predetermined threshold, with each first layer OS. This can be done by looking at the adjacency list of each OS in the co-occurrence matrix C or the associated matrix A, and select the first associated sets of ontological subjects, each set associated with each of first layer OSs. Create a second layer of nodes, underneath first layer OSs, and place the associated set of each first layer OS in the second layer underneath its corresponding the first layer OS (also called a parent node here). Each OS, i.e. node, in the associated set placed in the second layer points to its first layer parent node if that OS appears in only one associated set and is not a member of first layer set. In this case the node is called growing or non-dormant. If an OS in the second layer is also a member of first layer set then in the map the parent node points to that OS in the second layer and that OS ultimately address or points to its first appeared position in the first layer. In this case that node in the second layer is called dormant, and would not grow further than the second layer.

If an OS is not a member of first layer but is a member of more than one associated set, then that OS only growing under the parent with which it has the highest association value, points to that parent, and becomes dormant for other associated parents. When the OS becomes dormant, the parents point to that dormant OS and that dormant OS address or points to its growing position in the second layer.

For each of growing OSs of the second layer (called again the parent node as well), form an association set, having a desired number of OSs that have association value of higher than a predetermined threshold, with each of growing OS in the second layer. Create a third layer of nodes, underneath second layer, and place the associated set of each of growing nodes of the second layer OS in the third layer underneath its corresponding the second layer growing OS. Each OS, i.e. node, in the associated set placed in the third layer points to its the second layer parent node if that OS appears in only one associated set and is not a member of the first or the second layer set. If an OS in the third layer is a member of above layers, i.e. the first or the second layer, then in the map the parent node points to that OS in the third layer and that OS ultimately address or points to its first appeared position (growing) in the above layers. In this case that node in the third layer is called dormant, and would not grow further than third layer.

If an OS is not a member of above layers but is a member of more than one associated sets, then that OS only growing under the parent to which it has the highest association value, points to that parent, and becomes dormant for other associated parents. When an OS becomes dormant, the parents point to that dormant OS and that dormant OS address or points to its growing position in the same layer.

For each growing node in the third layer repeat the process and create more layers of the Map until all ontological subjects of the universe found a growing position in the map or until any other predetermined or desired criteria is met. Consequently or at the same time, index the map with appropriate indexing method. The indexing could be done, for example, by storing the adjacency matrix of the map or storing the adjacency list for each growing node in the map. As seen again, an OS can have one growing position but be dormant associates, i.e. dormant node, for many other growing OSs. Therefore dormant nodes are mirrors of growing nodes and essentially pointing to their growing position address in the index or having the same OS number when represented by a matrix.

After building the OSM and the index, we have a directed weighed graph that can be used for knowledge exploration, navigation, and many other applications. More importantly we can intrinsically measure the importance of each OS in the context of its universe.

Adjacency Matrix of OSM Graph

When we consider the OSM as a graph then mathematically we can represent the corresponding graph as: OSM= (OS, E) wherein OS is the set of ontological subject of the universe and E is the set of edges or connections and it is either a growing connection or dormant connections and can be divided as E={$e_{i,j}$,$\overline{e_{l,j}}$} in which $e_{i,j}$ means that there is a growing type connection between i and j (the arrow is from $OS_j$ to $OS_i$) and $\overline{e_{l,j}}$ is a dormant connection (the arrow is from $OS_i$ to $OS_j$).

The ontological subject map is a directed weighted graph that can be also shown by its adjacency matrix as:

$$M = \begin{matrix} & OS_1 & \ldots & OS_N \\ OS_1 \\ \vdots \\ OS_N \end{matrix} \begin{pmatrix} m_{11} & \ldots & m_{1N} \\ \vdots & \ddots & \vdots \\ m_{N1} & \ldots & m_{NN} \end{pmatrix} \quad (5)$$

in which, in one preferred embodiment of the invention, we have:

$$\begin{cases} m_{i,j} = A_{i,j} & \text{for } e_{i,j} \\ m_{i,j} = A_{j,i} & \text{for } \overline{e_{i,j}} \\ m_{i,j} = 0 & \text{everwhere else.} \end{cases}$$

The matrix M is most of the time asymmetric and sparse. The matrix M can further be divided by two adjacency matrix one showing only the growing type connections and another showing the dormant type connections.

OS Power Spectrums

In natural language type reasoning, ontological subjects carry a weight that is inherent in their intrinsic importance as they are the symbols of something in the universe. These symbols have been introduced or invented to name something and to represent something important. The more a subject is discussed by diverse group of people over a long period of time the more its intrinsic importance or power should be.

Power is a good choice for measuring the importance of the ontological subjects since everything goes back to energy and every entity can be represented by some energy value. So in proposing a discipline to the science of knowledge discovery a map that is build based on assigning an energy value or power value to ontological subjects is sensible. Such a map universally shows the connections between the most important things in the universe and sorts them based on their inherent power. The map, therefore, can guide a viewer or user to find subjects of intrinsic value to work on and help them to select an efficient route or trajectory for research and investigation of a subject matter that may lead to valuable results.

Therefore in one embodiment of the present invention we consider the relation between the nodes as a type of energy and power relationship and therefore a node has a power which is coming from its associated set of nodes in the OSM. If we regard the association value as amplitude then we can calculate the power of each OS versus its associated OS as:

$$P_i = P(OS_i) = \Sigma_{j=1}^{N} g_{i,j}(m_{i,j}) P_j \quad (6)$$

wherein g is a predefined function and in this embodiment (power/energy relationship between associated OSs) can be given by:

$$g_{i,j}(m_{i,j}) = \frac{m_{i,j}^2}{\sum_{j}^{N} m_{i,j}^2}. \quad (7)$$

Equation (6) is an eigenvalue equation and the intrinsic power of each $OS_i$ in the OSM graph is determined by the stationary solution of the equation (6), i.e. the eigenvector. However to make sure that the equation (6) is computable and has a unique eigenvector, corresponding to its dominant eigenvalue, we can rewrite the equation (6) as:

$$P = \left[\frac{\gamma}{N}I + (1-\gamma)G\right]P \quad (8)$$

wherein G is column-normalized matrix with entries $g_{i,j}$, which is also mostly an asymmetric and spars matrix, I is a N×N matrix with all entries 1, and $0 \leq \gamma \leq 1$ is a parameter indicating that some power of each node coming from the rest of the nodes that are not directly associated with that OS. Intuitively and most of the time the value of γ is selected from the interval [0.01, 0.5]. The eigenvalue equation of (8) can be solved numerically, for instance, by the power method and by selecting an initial power vector state $P_0$. The stationary eigenvector therefore, when power method is used, is given by:

$$P = \lim_{n \to \infty} \left(\left[\frac{\gamma}{N}I + (1-\gamma)G\right]\right)^n P_0 \quad (9)$$

The adjacency list of each OS, i.e. each row of the adjacency matrix M or G, can be viewed as the spectrum or power spectrum of each OS versus its associated set of OSs. The power spectrum can be used for quick comparison of different composition to each other and/or to a reference OSM.

Figure 5:
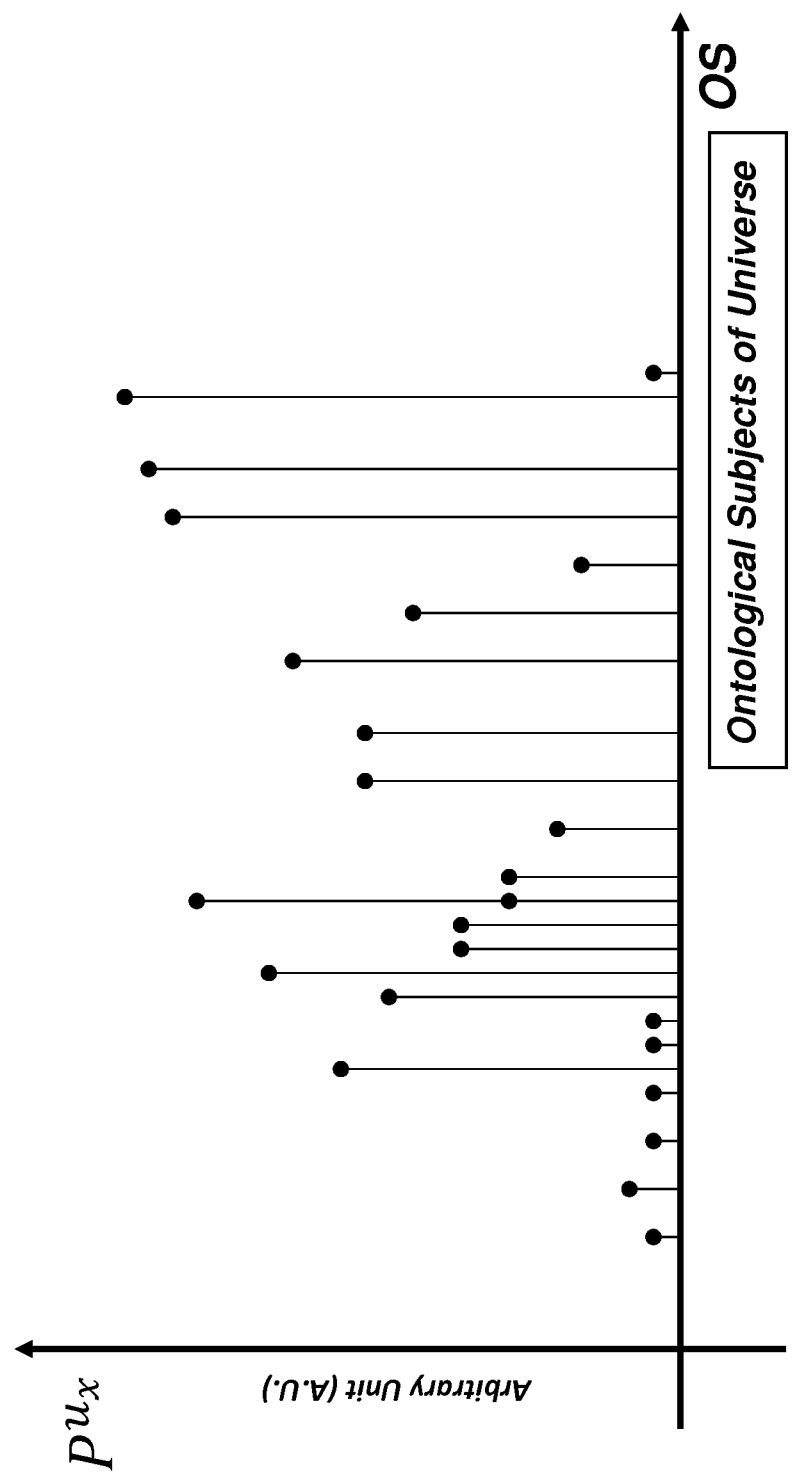
FIG. 5: is an exemplary representation of Ontological Subject (OS) spectrum of a universe x versus its constituent OSs.
Figure 6:
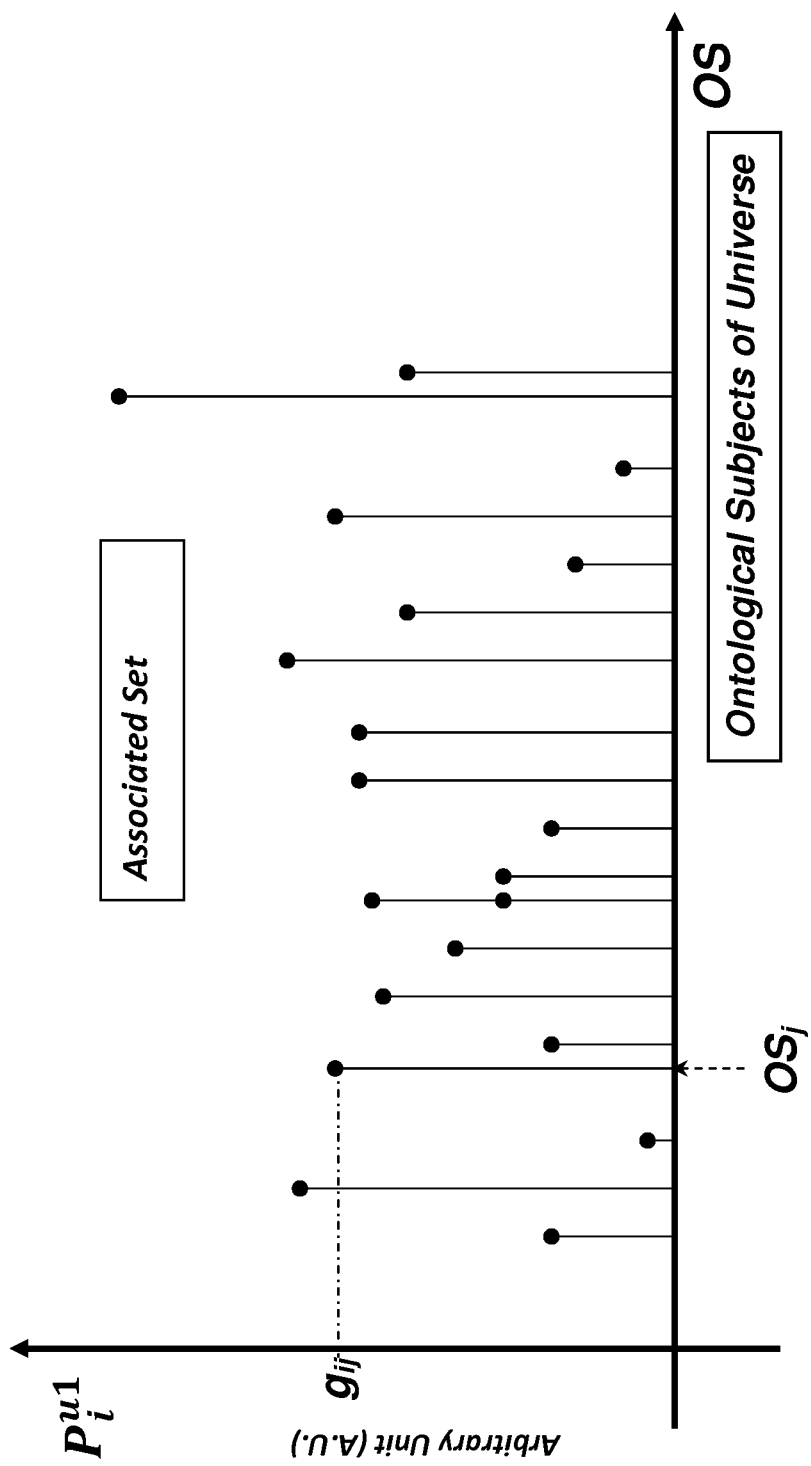
FIG. 6: is an illustration of an Ontological Subject spectrum of universe 1 versus its associated OS.

Referring to FIG. 5 now, the stationary OS power vector is shown as a discrete spectrum for an exemplary universe of a composition called $u_x$. FIG. 6 shows the power spectrum of the ith ontological subject of an exemplary universe called u1, i.e. $P_i^{u1}$. As seen in FIG. 6, the power of an individual ontological subject can be expanded versus the power of its associated set of OSs. As mentioned before the associated set is in fact the adjacency list of each OS in the OSM and their amplitude or associated power are the nonzero elements of the ith row of the matrix M or G.

OSMs for Comparison and Merit Measurement

One of the motives and application of the method and system of the invention is to use the method and system to compare compositions against each other and/or a larger composition and/or a collection of compositions. In doing so, two approaches may be employed alternatively or both at the same time.

One, or the first, approach, which is in fact a special case of the other approach, is to extract the ontological subject set of a first composition, e.g. called $OS_{u1}$, and build the co-occurrence matrix in u1 for that set, and uses the same set to build the co-occurrence matrix in the partitioned compositions of universe 2, u2.

Figure 7:
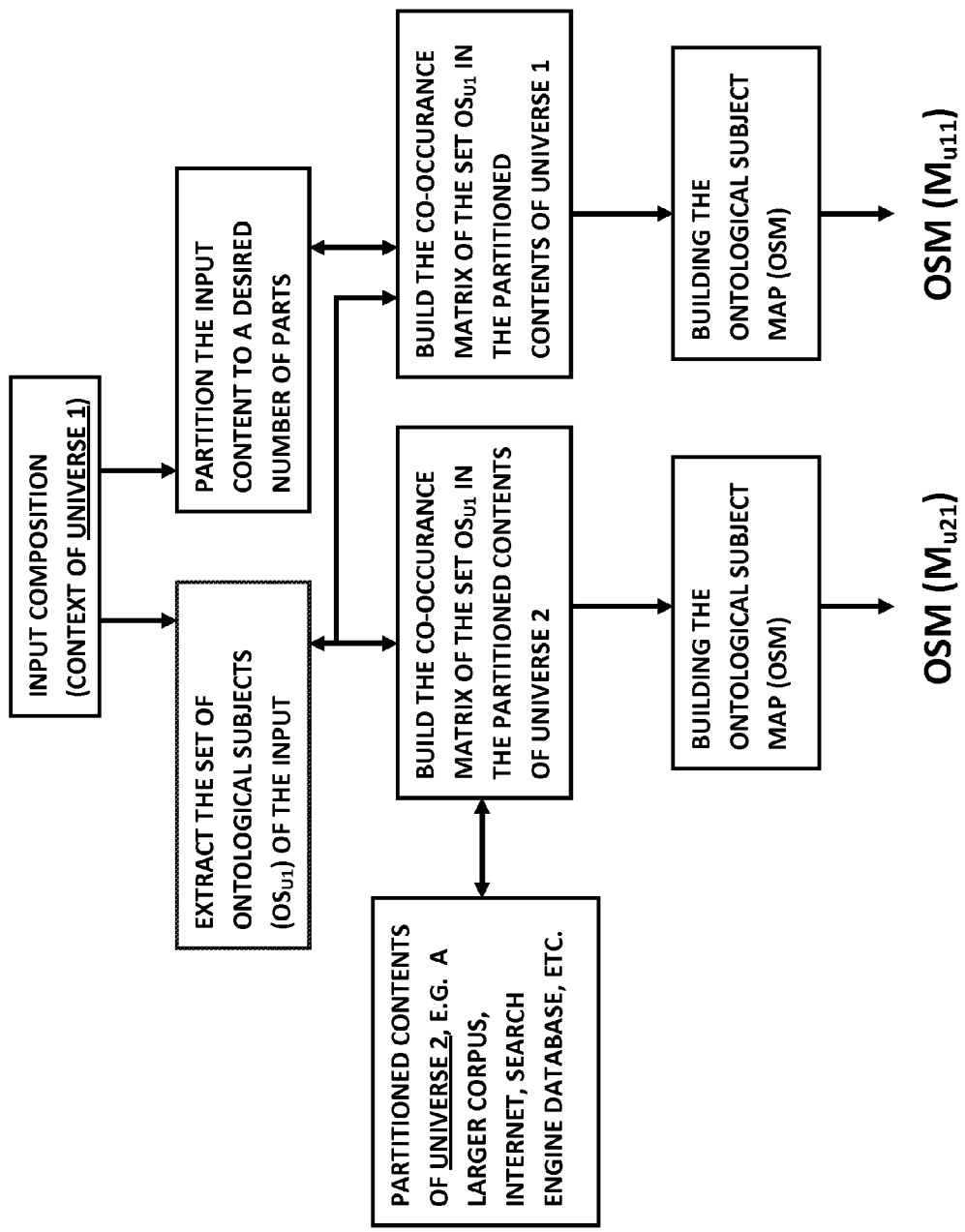
FIG. 7: is a flow diagram of constructing OSMs of a composition in the context of universe 1 and universe 2.

FIG. 7 shows one embodiment of implementing the OSM for two universes to be used for comparison, ranking, merit valuation and other applications. In FIG. 7 the ontological subject set of first composition, $OS_{u1}$, is extracted and used for constructing the co-occurrence matrix C from the u1, while we also construct co-occurrence of the same set, in the universe 2, u2, and consequently build the corresponding OSM for u1 and u2, i.e. $OSM_{u11}$ and $OSM_{u21}$ in FIG. 7.

The universe 2 could be simply another composition or could be a larger universe with more partitioned compositions, such as a collection of compositions, a corpus, or a collection of related compositions obtained from the internet using search engines, etc. In one important case the universe 2 is the repository of the whole internet which in that case the universe 2 is close to our real universe.

Commercial or in house search engine databases can be used to get the co-occurrences counts of each two OSs from the internet. When using internet and search engine, building a co-occurrence matrix could involve simply the "Boolean AND" search for each two OSs and looking at the hit counts. When the number of partitions or the compositions found in the internet, containing both OSs, is large enough, which is usually the case, the hit number is a good approximation of co-occurrence of each two OS in our universe. However for a more certainty in constructing co-occurrence matrix one may chose to download a plurality of composition form the internet and construct the co-occurrence matrix of $OS_{u1}$ in that collection of compositions which form the universe 2, u2. Using the teachings of the present invention we can then build two OSMs for the ontological subjects derived from u1. One of the OSM is build from the composition of u1 and another is build from composition of another universe say u2. The resulting OSMs denoted as $OSM_{u11}$ and $OSM_{u21}$ respectively as shown in FIG. 7.

Figure 8:
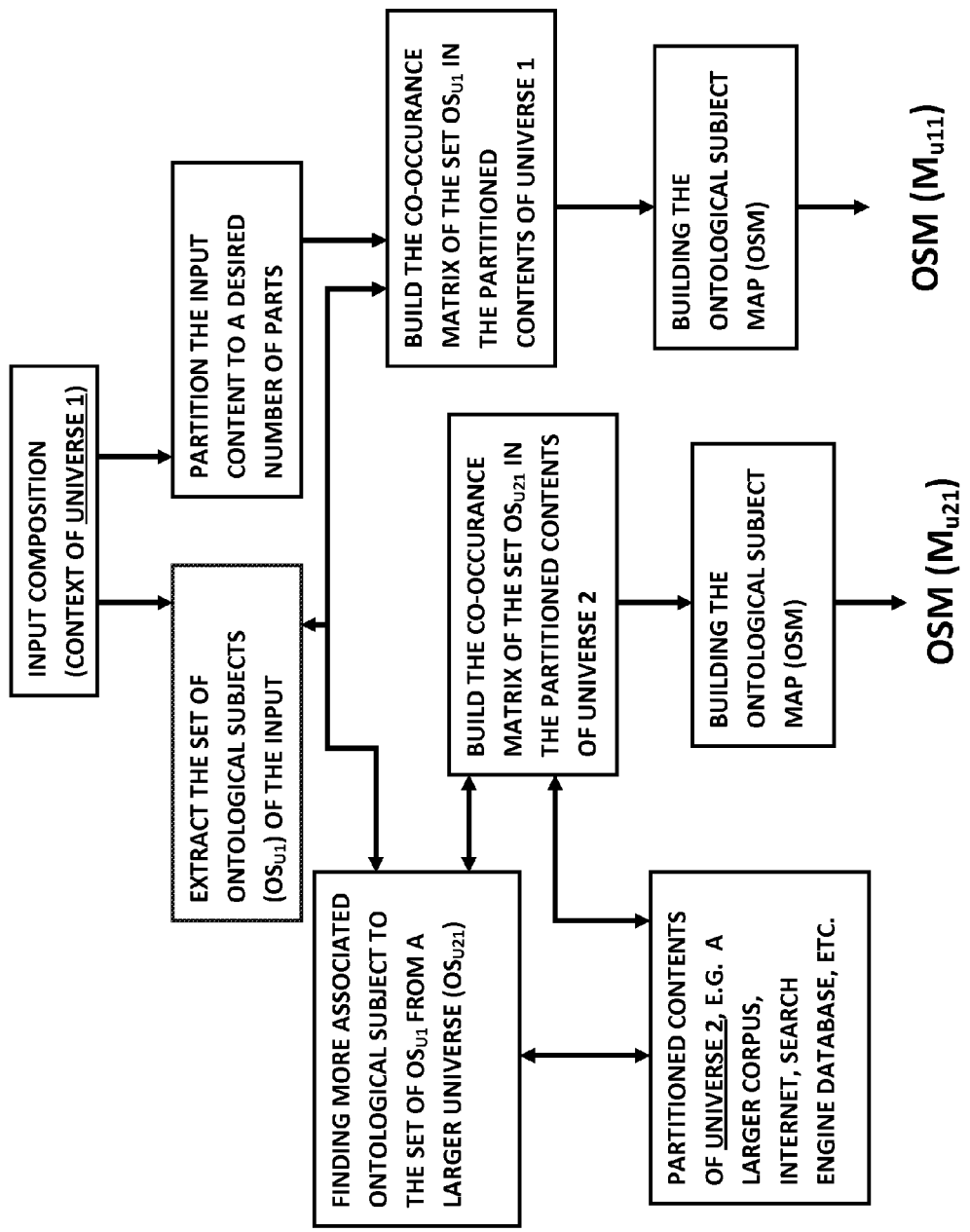
FIG. 8: is another flow diagram of constructing OSMs of a composition in the context of universe 1 and universe 2, wherein more associated OS has been added to the OSs of the input composition.

The other approach is to expand the number of OSs beyond the set of $OS_{u1}$. FIG. 8 shows that in this embodiment the extracted set of OS from u1, i.e. $OS_{u1}$, is used to construct $OSM_{u11}$, while by retrieving or obtaining more compositions containing one or more members of $OS_{u1}$, more associated OSs is extracted from those compositions and a desired number of total OS is selected, which is denoted by $OS_{u21}$ in FIG. 8. We then build the co-occurrence matrix C for the extended set of $OS_{u21}$ in the universe 2 and build the corresponding OSM as denoted in FIG. 8 by $OSM_{u21}$.

To find more compositions containing one or more members of $OS_{u1}$ we can use internet and search engine, or we can search in a premade database of composition such as large corpuses or collections of diverse compositions. Also, for instance, to find more associated OS for $OS_{u1}$ and expand the spectrum, we can use the strongest OSs in universe 1, derived from $OSM_{u11}$ and then search in the internet to get more related compositions from which more associated ontological subjects can be extracted.

Usually one of the universes (often the larger one) is used as the reference universe. The larger universe refers to a universe which has a higher number of ontological subjects, i.e. more knowable objects or subjects. The dimension of the OSM or the resulting matrix M or G is determined by the number of OSs from the larger universe. Hence the matrixes M and G for $OSM_{u11}$ and $OSM_{u21}$, and their corresponding stationary vector $p^{u11}$ and $p^{u21}$ will have the same dimension.

Figures 9A, 9B:
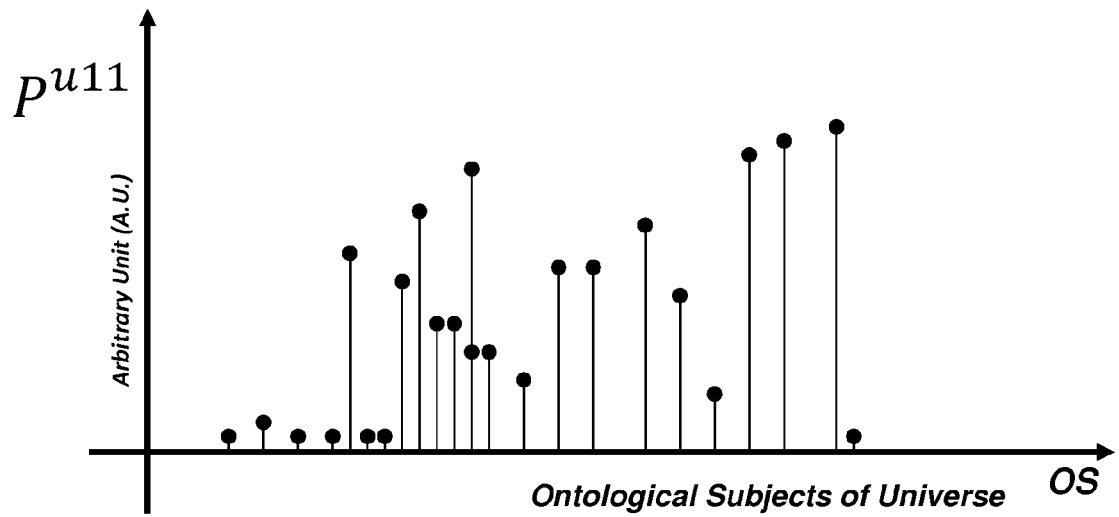
FIGS. 9a and 9b: a spectral illustration of two OSMs, one derived from the contents and context of universe 1 and another from the contents and contexts of universe 2.

FIGS. 9a, and 9b, show the spectrums of stationary power vectors versus their constituent ontological subjects derived from universe 1 and 2. For example FIG. 9a shows the OS power spectrum of $OS_{u1}$ derived from content of universe 1, $p^{u11}$, and FIG. 9b shows the OS power spectrum of $OS_{u1}$ derived from the contents of universe 2, $p^{u21}$. It is seen that, the first approach is, in fact, a special case of the second approach in which the set of $OS_{u21}$ is the same as set of $OS_{u1}$. Therefore FIGS. 9a and 9b can be used to represent both approaches.

The co-occurrence matrix of the universe with lesser number of OS, will have zero co-occurrence for those OS that do not exist in that universe. For comparison application, the OS axis covers the larger universe OS members. In one particular, but important case, the OS axis could be universal and containing the largest possible number of OS (all the OSs that have existed or known to the present time).

Referring to FIGS. 9a and 9b again, as seen the stationary power spectrums obtained from the content of universe 1 and universe 2 can be different. Apparently the corresponding matrixes, e.g. C, M, and G can also be essentially different. The differences convey important information about the validity, authoritativeness, novelty and generally the merits of a composition in larger contexts.

Figure 10:
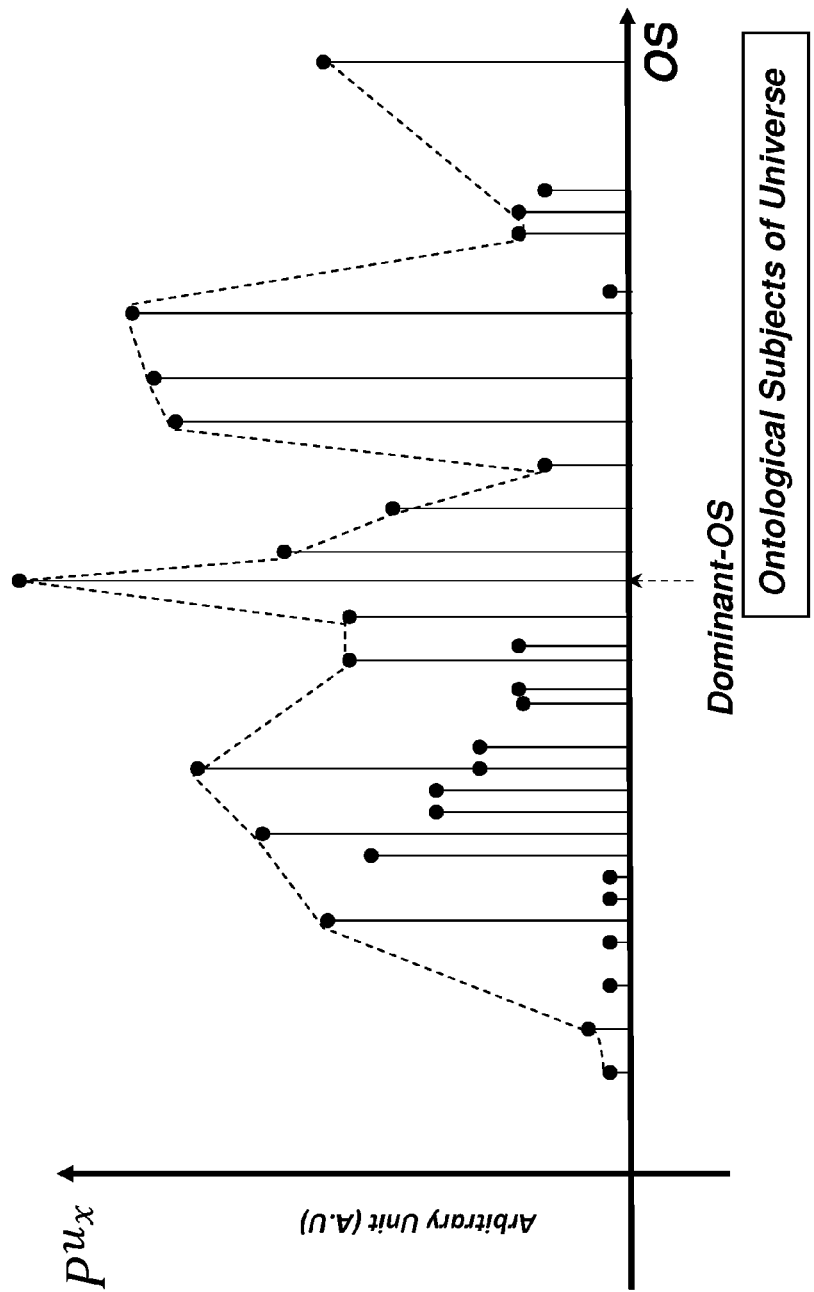
FIG. 10: an illustration of Ontological Subject spectrum of a universe x wherein the dominant OSs have been identified and the resulting spectral envelope is used as the summary or as the characteristic signature of the composition x.

FIG. 10 shows that a composition can also be identified with its dominant OSs using the resulting envelop spectrum by filtering out less powerful OS components. Those OSs components with less power than a predetermined threshold value might be treated as noises in some applications. Discrete Fourier transformation techniques may be employed for the OS power spectrum for variety of processing such as filtering and summarization as well as novelty detection, knowledge discovery etc.

Now consider that we want to analyze and assess a composition of universe 1 ($u_1$) in the context of a reference universe 2 ($u_2$). That is to use the ontological subjects of $u_1$ to construct the co-occurrence matrix in both universes. We can, then, build the OSM for each of the universes and construct the matrix M or G and consequently the power vector P for each universe. We now introduce few exemplary measures of merit for a composition of u1, in the context of a reference universe 2, u2. For example one measure of merit or merit parameter can be defined as:

$$mp_1 = \frac{P^{u11} \cdot P^{u21}}{\|P^{u11}\| \cdot \|P^{u21}\|} \tag{10}$$

where $mp_1$ is the merit parameter 1, and $\| \|$ in the norm of a vector. This merit measure is in fact a measure of correctness and substance of the composition of u1 in the context of reference u2. This measure can be readily used for ranking contents, e.g. ranking the contents of web pages or ranking documents in a collection of documents, etc. As seen by those skilled in the art one of the advantages of the power spectrum notion of compositions is the ability to use the well known method of spectral analysis and signal processing in dealing with text compositions or generally content analysis.

The association value matrix A and/or the adjacency matrix M and/or the power matrix G also convey interesting and important information about the content of composition of u1. For instance, another useful set of data related to measures of merit of a composition in the context of the reference universe u2, are obtained by the differential power matrix which is defined as:

$$G^d = [G_{u1} - G_{u2}] \tag{11}$$

wherein $G^d$ is the differential power matrix which contains interesting and valuable information about authoritativeness, novelty and/or substance of a composition compared with a reference universe of u1.

The matrix $G^d$ can be represented visually by using, for example, mesh or counter plot from MATLAB® software or any other desirable tools and methods. When the matrix $G^d$ is represented visually, interesting features of the composition of u1 in the context of u2 can be seen. For example when there is a perfect match then the $G^d=0$ and no bump or intensity difference in the mesh or plot can be seen. However, when $G^d \neq 0$ the mesh or plot can show the location and intensity of differences visually, and guide a user to look into these areas for further analysis and investigation. Therefore $G^d$ can point to novelty, new knowledge, or flaws in the composition.

When the reference universe is large enough, the reference universe can be viewed as the contemporary collective knowledge of people as whole or a large group of people expert in a domain of knowledge. For instance, the sum of all rows or columns of the differential matrix, $G^d$, is an indication of magnitude of general deviation of a composition from the status quo knowledge or collective understanding of the present time about a subject. Alternatively a sum over a row or a column of the differential matrix, $G^d$, is a measure of local differences and deviation of power and emphasis of each OS, used in the composition, from the collective wisdom or collective knowledge of people about that OS.

Depends on the application, more sophisticated or detailed analysis can be introduced or used without departing from the scope and spirit of the invention. For example one may define another measure of merit or merit parameter as follow:

$$mp_2 = \frac{\sum_j \sum_i \left( m_{i,j}^{u11} \sqrt{p_i^{u11}} - m_{i,j}^{u21} \sqrt{p_i^{u21}} \right)^2}{\|P^{u11}\| \cdot \|P^{u21}\|} \quad (12)$$

where $mp_2$ is the second exemplary merit parameter, $p^{u11}$ and $p^{u21}$ are the power vector of the universe 1 and 2 respectively, $p_i^{u11}$ and $p_i^{u21}$ are the power of $OS_i$ derived from $OSM_{u11}$, and $OSM_{u21}$ respectively, and $m_{i,j}^{u11}$ and $m_{i,j}^{u21}$ are the elements of the matrix M corresponding to $OSM_{u11}$, and $OSM_{u21}$ respectively. Here $mp_2 \geq 0$ and may be a more accurate measure of similarity and substance than $mp_1$.

Alternative Spectrums and More Merit Measures

More quantitative measures or alternative formulation is possible to envision with minor differences from the method presented in this invention which was explained by the exemplary embodiments.

Specifically the function g in equation (6) can be defined linearly so the elements of matrix G are linear functions of elements of matrix M. In one special case G can be the same as matrix M. Furthermore instead of M, the adjacency matrix of the OSM, one can also use the co-occurrence matrix C or column-normalized association matrix A in equation (6) to (9), to derive another set of similar formulations, or use a different view or interpretation of the OS spectrums of universes. Other types of OS power spectrums or additional calculable parameters and data can also be used, for more comprehensive analysis of compositions and knowledge processing applications. Those skilled in the art can alter the formulations without departing from the scope and spirit of the present invention.

Exemplary Applications

The method is based on intrinsic value of subjects in a universal context and therefore a better platform for comparison, ranking, and retrieval applications for the compositions. Therefore, in below few exemplary and non comprehensive applications of the present invention are given.

1) Classification, indexing and ranking documents: find the principle OS (the strongest OS) for each documents, classify and index them under their principle OS; and, using the same reference universe, rank them in a classified list based on the value of one or more of the merit parameters. Furthermore, the classes can also be ranked according to their OS power in the universal context. Apparently a composition can be listed under different classification and have different rank for different classes or categorizations, i.e. for different OSs. Ranking new or existing contents based on their intrinsic value or power has applications in information and knowledge retrieval such as web page ranking for search engines.

2) The OSM map uniquely positions the ontological subject in a map based on its importance and power. The map is very instrumental in knowledge exploration and guiding searchers and researchers for more efficient way of finding a solution for a challenging problem of intrinsic importance. Additionally, a system having premade OSMs databases or real time OSM building capability can present a road map to a user graphically or suggesting a research trajectory for exploration of a subject matter thereby increasing the user efficiency in learning, discovery and production of more valuable compositions. The map can also be used to zoom in to show a detailed association of an OS with less powerful or important OSs (micro view), or zoom out to see the position of an OS in the universal scale OS map (bigger picture view). Moreover, a content creator can quickly and conveniently assess his created composition and benefit from the instant feedback from the system to learn about the weakness and strength of her/his composition.

3) Measuring the merit of newly composed contents is another important application for timely publication of important contents. Few applications of OSM in the area of publishing have been discussed in the US patent application entitled "Assisted Knowledge Discovery and Publication System and Method", filed on Jul. 24, 2008, application Ser. No. 12/179,363, by the same applicant. The mentioned disclosure use OSM for systematic knowledge discovery and publication of valuable contents either scientific or artistic by comparing and ranking documents and giving feedback to referees and creators systematically.

4) Summarizations and reporting: the OSM method and system and the analysis presented in this invention can be used for summarization purposes. For example, one can select the highest power OS of the composition and for one or few of the highest power OS (the lead or anchor OSs) look for the specifically expressed statements that contain both terms and should be selected to be used n the summary of the composition. As mentioned before, FIG. 10 shows an illustration of OS spectrum of a universe of the composition x wherein the dominant OSs have been identifies or hunted wherein the resulting envelope can be used as the summary, snapshot, and concise characteristic signature of the composition x. Providing a summary from the OS spectrum envelop should be straight forward since in the process of building the OSM and calculating the stationery power vector of OSs we have had built the participation matrix PM (see (1)) so we can quickly select the most important partitions of the composition, from (1), containing the most important OSs.

5) Filtering and distillation of compositions: the method is similar to summarization but with the option to verify the summary statements in a larger contexts and larger universe by statistically verifying the trueness of the statement used in the composition of the universe. Moreover using Fourier transformation techniques the OS spectrum can be filtered automatically to keep the dominant OSs for consecutive knowledge processing operations.
6) Ontology building: using the map and the adjacency matrix of the map to fill ontologies by selecting an OS, or two or more associated OSs, from the OSM and searching in the internet, or looking into the participation matrix, or any other corpus for explicitly expressed relations of one, two or more OS and verifying the trueness of the statements statistically.
7) Question answering applications: The system and method can be used to find, in real time, valid and verified answers of intrinsic importance to a question. Moreover, one can use pre-built ontologies, mentioned in previous exemplary application, for question answering applications.
8) Contract researching: an small entity can use the method and system to perform professional research for a third party at higher speed and with more substantial results.
9) Personal and individual users can use software, developed based on the method of the present invention, to train them over the internet or private networks employing personal computers or personal consuls.
10) Educational institutes or research centers can use the method and system of the present invention to train and educate their staff, students, and clients more efficiently. The student essays, papers, and scientific contribution can be scored by composition analysis engine using the method and teaching of the present invention.
11) Business applications: the system and method can be used for competitive analysis of business proposals, intellectual properties, marketing researches, financial analysis, market trend forecasts, and the like, in terms of their validity, substance, competitive advantages, and novelty. The system and method can be used for intrinsic merit evaluation of business proposals and impact estimation of a business venture.

Premade and Universal OSM Embodiments

Figure 11:
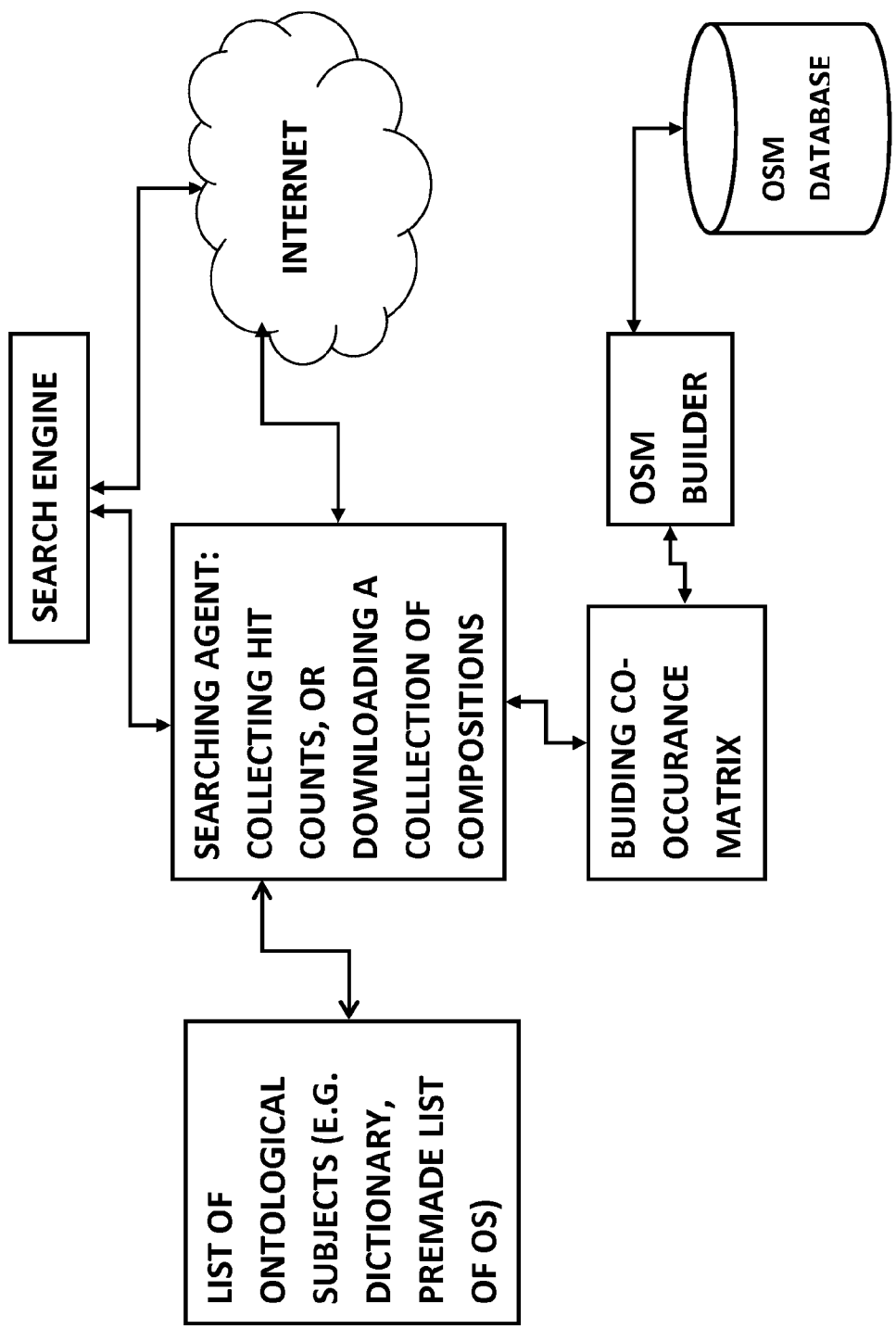
FIG. 11: schematic view of the system and method of building an OSM using search engine and internet and pre-made list of ontological subjects.

In many applications it is faster and advantageous to have premade OSMs to be used as references for different compositions. FIG. 11 shows schematic view of one exemplary embodiment of the basic processing blocks of a system and method of building an OSM using search engine and internet and premade list of ontological subjects. In this embodiment we use a list of ontological subjects that have been already assembled or extracted from the compositions or any other ready to use list of OSs. The premade list is fed to a searching agent that has access to a search engine data base. The role of searching agent is to find the co-occurrence information of each two OS in the internet or a search engine database, or if desired or appropriate finding and retrieving, a desired number of related compositions to the fed OS. Then the co-occurrence builder estimate and builds the co-occurrence matrix using the information that is provided by the searching agent, e.g. hit counts, or alternatively build the co-occurrence matrix by processing the retrieved compositions by the searching agent, using the described methods of present invention. After the co-occurrence matrix was build, another block of software builds the OSM using the algorithm of the present invention. The resulting OSM is then indexed in a database by an OSM indexer (not shown in the FIG. 11).

It should be noticed that in this embodiment the universe contains all the compositions that exist in the internet and therefore the resulting premade OSMs are indicatives of general understanding or distilled state of knowledge about the ontological subjects. When the input list of OS is already classified and contains a group of related OSs, the resulting OSM can also be categorized under the same classifications. Therefore we can have specific premade OSMs for different classes or related OSs. However, when the input OS list is general and large enough, the resulting OSM is also general. The larger the list of input OS, the broader the extent of OSM would be and the closer the OSM would become to underlying realties of the universe. One should expect to have good true knowledge of our universe when the input list of OS contains all existing and conceivable ontological subjects of the world in its largest extent. In this case the resulting OSM is universal and very close to true realties of our universe. A universal OSM can be very instrumental in new knowledge discovery, since the connection of everything in the universe to everything else in the universe is established and revealed.

Application Systems

Many system configurations can be proposed to implement the method and teachings of the present invention that provide a service to users for one or more of the mentioned exemplary applications or many other that were not listed.

Client server system architecture over networks and internet is well known so that we do not show the exemplary computer architecture and network topology of such client server systems. Accordingly, in FIG. 12 only the basic blocks of the service and the related functions and analytical engines are given for handling three of such request for service applications.

Figure 12:
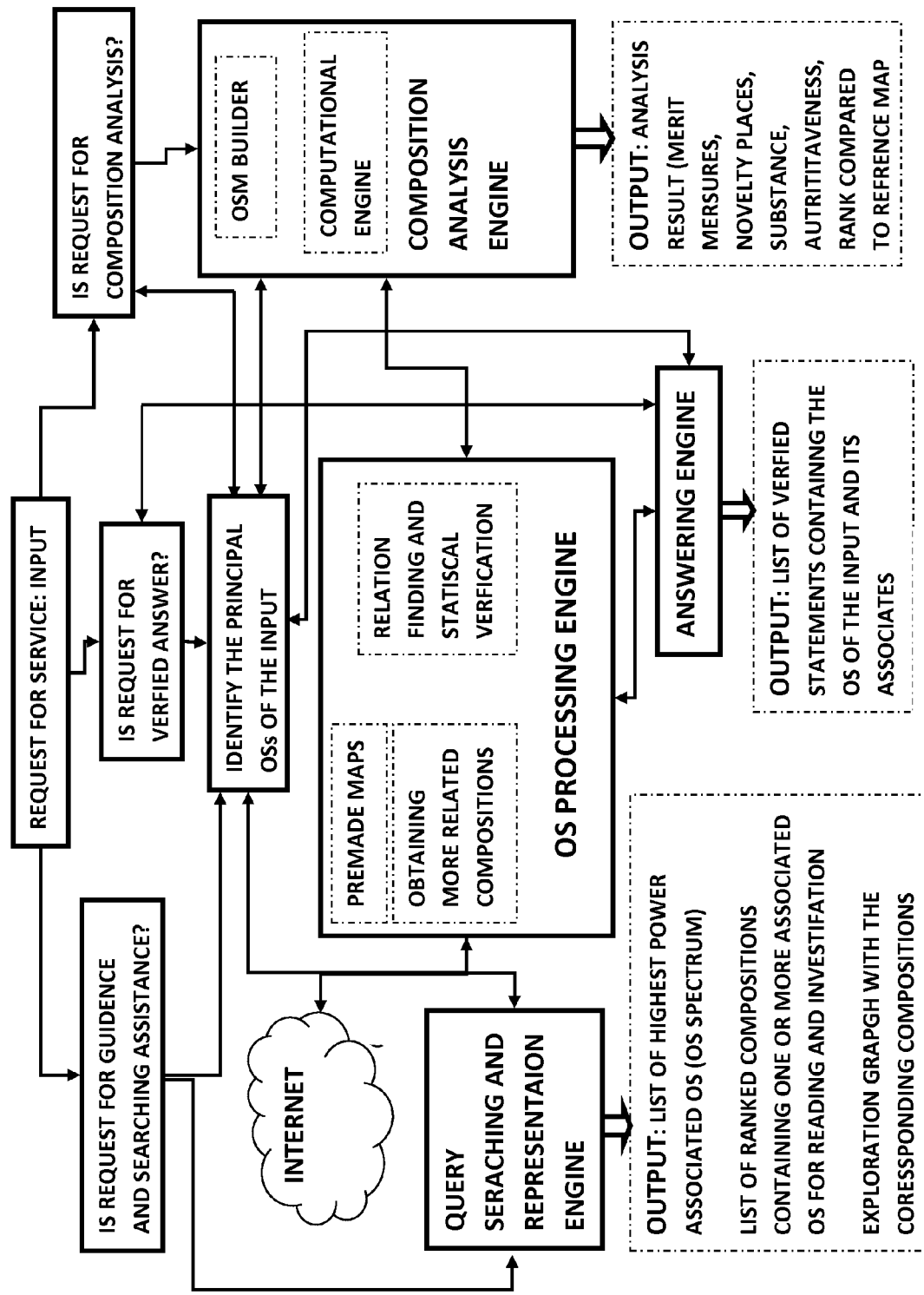
FIG. 12: shows a client server type system to fulfill requests of users for services such as composition analysis, search priority and research trajectory guidance, or distilled knowledge answering, according to one exemplary embodiment of the invention.

FIG. 12 shows one exemplary embodiment of a system of implementing few of the above applications for using as service by users and clients. As seen in FIG. 12: there is an OS Processing Engine (OSPE) that in conjunction with Application Engines (AE), e.g. Composition Analysis Engine (CAE), provide the requested services such as composition analysis, search priority and research trajectory guidance, or distilled knowledge answering, to the user. A user requests a service through network to the system. The system then provides the service by sending the outputs, in response of user's request, to the user. In this embodiment, the frond end interfaces are not shown. A person ordinary skilled in the art can readily envision and build a satisfactory interface that a user can interact with to request and get the service from the system of FIG. 12.

For instance, in this embodiment, a request could be a natural language question which needs one or several statements of the facts as the answer. Alternatively, a user might want to analyze a newly composed composition in the context of much larger reference universe, or a user simply would like to get guidance for researching about a subject matter. In this exemplary embodiment there are functional blocks that identify the type of service that user has requested, and then the request is passed to the principle OS identifier of input information attached to the request. The user provides some content with the request and therefore the rule of the principal OS identifier is to extract the main OS of the content accompanying the request.

Once the type of request was identified the request and its main OS/s get routed to corresponding application engine. The application engine then interacts and communicates with the OS Processing Engine (OSPE) to perform its task and provide the requested information to the user as the output.

The outputs corresponding to each service, as expressed in the FIG. 12, is self explanatory in the view of the present invention teachings.

The OS Processing Engine (OSPE) is responsible to provide the necessary information and processing functions that is requested by the application engine. The OS processing engine for instance provides the list of associated OS of input OS, either from premade OSMs or by obtaining the related compositions and finding the associated OSs with highest associated value. The OS Processing Engine (OSPE) is capable of building OSM for an input composition on demand. The OSPE will also be able to build an OSM from the repositories that contain a predetermined number of associated OSs to the main OS of the input. Moreover, it can also look for explicit relations between OSs from in house repositories or internet resources. Furthermore, it is capable of verifying the trueness of the statements by statistical analysis of the hunted statements containing one or more of the OSs.

In summary the invention provides method and systems for enhancing new knowledge creation and accelerating the knowledge discovery. The invention can serve knowledge seekers, knowledge creators, inventors, discoverer, as well as general public, by assisting and guiding them to assess their creation, identify their unknowns, and helping them to plan their research trajectory while providing high quality contents related to their working subjects. The method and system, thereby, is instrumental in increasing the speed and efficiency of knowledge creation, retrieval, learning, and problem solving to name a few.

It is understood that the preferred or exemplary embodiments and examples described herein are given to illustrate the principles of the invention and should not be construed as limiting its scope. Various modifications to the specific embodiments could be introduced by those skilled in the art without departing from the scope and spirit of the invention as set forth in the following claims.

What is claimed is:

1. A method of indexing ontological subjects of at least one composition into at least one ontological subject index, said index may correspond to a map and/or a graph of ontological subjects derived from the composition, comprising:
   a. decomposing the at least one composition to at least one partition;
   b. extracting at least some of ontological subjects of said at least one composition;
   c. constructing one or more data arrays corresponding to at least one participation matrix representing participation of at least one of said extracted ontological subjects into one or more of said partitions by having a non-zero value in the corresponding entries of the participation matrix, wherein each row of the participation matrix is representative of one of said extracted ontological subjects and each column of the participation matrix is representative of said partitions or vice versa,
   d. constructing one or more data arrays, corresponding to at least one matrix representing co-occurrences of each two of desired some of said some of ontological subjects, in the at least one partition of the at least one composition, from the one or more data arrays corresponding to said at least one participations matrix,
   e. constructing the at least one ontological subject index from said one or more data arrays, corresponding to said at least one matrix representing co-occurrences of ontological subjects and/or to said at least one participation matrix, said index may correspond to a map and/or a graph configured to uniquely assign one or more of the ontological subjects in the map wherein each ontological subject is connected to at least one of, other than itself, said uniquely assigned ontological subjects; and
   f. processing and/or storing the data of the index onto one or more non-transitory computer readable storages.

2. The method of claim 1, wherein the at least one composition is obtained from the internet.

3. The method of claim 1, wherein the at least one composition includes at least one collection of electronic contents from the Internet.

4. A method of claim 1, wherein at least one of the at least one participation matrix is a binary matrix having the entries of ones and zeros only.

5. The method of claim 1, further comprising: evaluating numerically an association value for a selected number of pairs of ontological subjects, by multiplication of each corresponding two rows or columns of the participation matrix, and wherein the multiplication product can further be normalized according to predetermined formulas.

6. The method of claim 1, wherein the ontological subject index further is represented with at least one data array corresponding to a map, wherein each indexed ontological subject is shown by an object in the map connected to one or more objects.

7. The method of claim 1, wherein the ontological subject index is used for identifying at least one of:
   a. related ontological subjects;
   b. most important subjects related to another ontological subject; and
   c. indirect relation of two or more ontological subjects,
whereby increasing efficiency in searching, finding, and acquiring new knowledge.

8. The method of claim 1 further comprising:
   a. finding explicit forms and statements of relations of association between two or more of a selected number of ontological subjects by finding the partitions containing one or more of the selected ontological subject from the participation matrix; and
   b. presenting to a client and/or recording and/or storing at least one of said explicit forms of relations in a database configured for retrieval.

9. The method of claim 1, further comprising:
   a. providing a reference ontological subject index built from a selected list of ontological subjects and a selected collection of compositions;
   b. building an ontological subject index for a received composition, wherein the index has at least one layer and has at least one ontological subject at its first layer;
   c. calculating value and/or a score of at least one measure of merit for the received composition by analyzing data respective of the ontological subject index of the received composition and data of the reference ontological subject according to a predetermined formula.

10. The method of claim 1, wherein the index is used to calculate an importance value for at least one of ontological subjects of the composition thereby having a vector or spectrum of importance value in context of the composition's universe, wherein the spectrum can further be represented by at least one form of spectral graph having ontological subjects in one axis and showing the importance value of the ontological subject in another axis.

11. The method of claim 1, wherein said index is used to calculate an importance value of at least one ontological subject by at least one computer implemented routine for numerically solving at least one associated eigenvalue equation employing one or more adjacency matrix corresponding to said map and/or graph.

12. The method of claim 3, wherein the at least one collection of electronic content includes part or whole contents of an internet search engine database.

13. The method of claim 4, wherein the index is used to calculate an importance value for each ontological subjects of the composition thereby having a vector or spectrum of importance value in context of the composition's universe.

14. The method according to claim 5, further comprising:
  a. finding explicit forms and statements of relations of association between two or more of a selected number of ontological subjects by finding the partitions containing one or more of the selected ontological subject from the participation matrix; and
  b. presenting to a client and/or recording and/or storing at least one of said explicit forms of relations in a database configured for retrieval.

15. The method of claim 6, wherein the ontological subject index and the map is used to guide and show to a user routs for exploration in search of knowledge embedded in the composition, thereby assisting the user in knowledge discovery.

16. The method of claim 8, wherein said database of explicit form of relations is used as an ontology and wherein is further configured to become up to date periodically or continually.

17. The method of claim 8, wherein said database of explicit form of relations is used by a client server system of question and answering comprising:
  a. receiving a request or a question containing one or more of ontological subjects;
  b. finding an appropriate answer for the request from said database which contains one or more of the ontological subjects of the received request or question.

18. The method of claim 14, wherein said ontology is used by a client server system of question and answering comprising:
  a. receiving a request or a question containing a plurality of ontological subjects;
  b. finding an appropriate answer for the request from said ontology which contains one or more of the ontological subjects of the received request or question.

19. The method of claim 9 further comprising: classifying the composition based on its score of at least one measure of merit and/or predetermined criteria, whereby to organize a large number of received compositions automatically.

20. The method of claim 9, wherein said reference ontological subject index and for map is used for scoring the merit of a composition in terms of validity, novelty and importance by comparing the spectrum of the composition with that of the reference map.

21. The method of claim 10, wherein said importance values is used to weight and/or rank the importance of the partitions of the composition, thereby having an importance value vector for the partitions.

22. The method of claim 21, wherein the importance value vector of the partitions of the composition is used to select a desired number of the partitions based on at least one of following factors:
  1. their importance value,
  2. the spectrum of ontological subject importance values;
  3. the position of ontological subject on a map derived from the index, or
  4. predetermined criteria and formulas engaging at least one of data arrays associated with one or more maps derived from the index,
  whereby to filter the composition, to summarize the composition, or to extract the desired partitions of the composition.

23. The method of claim 13, wherein said importance value vector is used to weight and rank the partitions of the composition by multiplying the importance vector of the ontological subject by the participation matrix thereby obtaining an importance value vector for the partitions of the composition.

24. The method of claim 23, wherein the importance value vector of the partitions of the composition is used to select a desired number of the partitions based on at least one of following factors:
  1. their importance value,
  2. the spectrum of ontological subject importance values;
  3. the position of ontological subject on a map derived from the index, or
  4. predetermined criteria and formulas engaging at least one of data arrays associated with one or more maps derived from the index,
  whereby to filter the composition, to summarize the composition, or to extract the desired partitions of the composition.

25. A computer implemented method of investigation of a composition of ontological subject comprising:
  a. selecting one or more ontological subject employed in the composition to describe a universe,
  b. constructing one or more data arrays corresponding to at least one participation matrix representing participation of at least one of said selected ontological subjects into a plurality of partitions of the composition by having a non-zero value in the corresponding entries of the participation matrix, wherein each row of the participation matrix is representative of one of said selected ontological subjects and each column of the participation matrix is representative of said partitions or vice versa,
  c. constructing one or more data arrays, corresponding to at least one matrix representing co-occurrences of each two of said some of ontological subjects in the plurality of partitions of the composition, from the one or more data arrays corresponding to said at least one participations matrix,
  d. calculating an association value between at least one ontological subject and one or more of other ontological subject based on the data of at least one of said participation matrix and/or at least one of said matrix representing co-occurrences of the selected ontological subjects,
  e. selecting, for each of at least one desired ontological subject, an associated set, said set contain zero or more of the ontological subject as its members, wherein members of said associated set are selected based on predetermined conditions of having a predetermined association value with said desired ontological subject and/or having predetermined criteria related to their membership in association set of other desired ontological subject,
  f. constructing at least one data array containing information of at least one association set corresponding to at least one ontological subject of the composition.

26. The method of claim 25, wherein the associated set of an ontological subject is represented by a data array indicative of at least one form of spectral graph having ontological subjects in one axis and showing the association value of the members of the set in another axis.

27. The method of claim 25 wherein the ontological subjects of at least one set of ontological subjects is selected based on importance of its one or more members according to at least one importance factor.

28. The method of claim 25 wherein the members of said at least one associate set are selected based on their importance according to at least one importance factor and their association value to one or more ontological subjects.

29. The method of claim 25, wherein said data array of at least one association set is used to do one or more of the followings:
   a. representing at least one map or and/or graph,
   b. using to calculate an importance value for each ontological subject by at least one computer implemented routine for numerically solving at least one associated eigenvalue equation employing one or more adjacency matrix corresponding to a representative map, wherein the resulting importance values is used as a discrete signal for further processing and transformation of the composition and the ontological subjects therein.

30. The method of claim 25, wherein at least one composition is obtained from internet and/or contains content of at least some parts of internet repositories.

31. The method of claim 25, wherein at least one composition contains one or more string of DNA code or one or more partitions of DNA code.

32. The method of claim 29, wherein said data array is recursively rearranged after calculating the importance of ontological subjects to represent updated importance of said one or more ontological subjects of the composition.

33. The database and the map of claim 29, wherein said resulting discrete signal is used as a signature of the composition and is further used for clustering, classifying, and ranking a plurality of compositions by measuring at least one similarity measure among said signals corresponding to the plurality of the compositions.

34. A computer implemented method of indexing ontological subjects of one or more compositions comprising:
   a. getting at least one composition of ontological subjects describing a universe,
   b. partitioning the at least one composition into a plurality of partitions,
   c. extracting at least some of ontological subjects of said at least one composition,
   d. constructing one or more data arrays corresponding to at least one participation matrix representing participation of at least one of said extracted ontological subjects into a plurality of partitions of the composition by having a non-zero value in the corresponding entries of the participation matrix, wherein each row of the participation matrix is representative of one of said extracted ontological subjects and each column of the participation matrix is representative of said partitions or vice versa,
   e. constructing one or more data arrays, corresponding to at least one co-occurrence matrix representing co-occurrences of each two of said some of ontological subjects in the plurality of partitions of the at least one composition, from the one or more data arrays corresponding to said at least one participations matrix,
   f. evaluating an importance score for the extracted ontological subject of the at least one composition based on one or more predetermined criteria of importance, using the data of said at least one participation matrix and said at least one co-occurrence matrix,
   g. evaluating numerically an association value for a selected number of pairs of ontological subjects, using the data of said at least one participation matrix and said matrix representing co-occurrences of the extracted ontological subjects in the plurality of partitions of the at least one composition, and
   h. indexing some or all of the extracted ontological subjects in such a way that each said ontological subject is indexed under the most important ontological subjects, excluding under itself, that it has the highest association value with,
   i. processing and/or storing the indexing data into one or more data arrays.

35. The method of claim 34, wherein at least one of said one or more compositions contains one or more string of DNA code or one or more partitions of DNA code.

36. The method of claim 34, wherein at least one of said one or more compositions includes at least one collection of electronic contents from the Internet.

37. The database of claim 34, wherein said indexing data array further configured to include association strength between an ontological subject and one or more of its associates.

38. The method of claim 36, wherein the at least one collection of electronic content includes part or whole contents of an internet search engine database.

39. A system of building and storing ontological subject indexes and/or maps for use by at least one computer executable application program comprising:
   a. at least one non-transitory computer readable medium having computer program instructions embodied therein for causing one or more processors to build said ontological subject indexes and/or maps for one or more composition of ontological subjects;
   b. one or more storage means for storing and retrieving data accessible by at least one of said computer program and said at least one computer executable application program to execute their program instructions and to process the ontological subjects of at least one of the one or more compositions, whereby making the results of the process available for using by other application programs or a user, and
   c. a computer implemented based ontological subject processing engine to perform at least one of followings:
      i. building ontological subject indexes and maps,
      ii. performing spectral analysis of composition,
      iii. retrieving the desired data from the databases, and
      iv. providing the data for the server in response to the client or user's client.

40. The system of claim 39, wherein further comprising:
   a. facilities to access a plurality of composition;
   b. facilities for receiving an input composition from a client;
   c. at least one computer executable program module for accessing at least one data array, corresponding to at least one stored reference index or map, and/or for building a reference ontological index or map in response of the client's input;
   d. one or more computer implemented ontological subject processing engines to process and analyze the received composition utilizing data of the reference index or map; wherein the results of the process and analysis becomes available for using by a client.

41. A client and server system for providing one or more services to at least one client comprising:
   a. a data storage capable of storing one or more data arrays or databases corresponding to one or more ontological subject indexes;
   b. means to access a collection of compositions;
   c. one or more server module to facilitate connection from said at least one client to receive an input and/or interpreting the client's request for service;

d. a computer implemented computational engine to perform the calculations required to fulfill the client's request;
   wherein the computational engine process the at least one client's request by fetching at least one composition, getting related data from the one or more data arrays or databases; and run one or more computational engine to produce the data required to assemble a response in a predetermined format and send the response to the client, and
e. a computer implemented based ontological subject processing engine to perform at least one of followings:
   i. building ontological subject indexes and maps,
   ii. performing spectral analysis of composition,
   iii. retrieving the desired data from the databases, and
   iv. providing the data for the server in response to the client or user's request.

42. The system of claim 41, wherein the system is distributed and at least one part of the system is physically located in, or performs from, different location from the rest of the system.

\* \* \* \* \*